(12) United States Patent
Delaporte et al.

(10) Patent No.: US 12,372,000 B2
(45) Date of Patent: Jul. 29, 2025

(54) FOIL, ROTOR BLADE, ASSEMBLY FOR A TURBOMACHINE ROTOR AND ROTOR

(71) Applicant: SAFRAN AIRCRAFT ENGINES, Paris (FR)

(72) Inventors: Nicolas Daniel Delaporte, Moissy-Cramayel (FR); Pierre Marie Mulheim, Moissy-Cramayel (FR); Arnaud Martine, Moissy-Cramayel (FR); Antoine Giguet, Moissy-Cramayel (FR); Vincent Goyon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/575,954

(22) PCT Filed: Jun. 21, 2022

(86) PCT No.: PCT/FR2022/051203
§ 371 (c)(1),
(2) Date: Mar. 21, 2024

(87) PCT Pub. No.: WO2023/275456
PCT Pub. Date: Jan. 5, 2023

(65) Prior Publication Data
US 2024/0337192 A1    Oct. 10, 2024

(30) Foreign Application Priority Data
Jul. 2, 2021    (FR) ...................... 2107207

(51) Int. Cl.
*F01D 5/30* (2006.01)
*F01D 5/32* (2006.01)

(52) U.S. Cl.
CPC ........... *F01D 5/3007* (2013.01); *F01D 5/326* (2013.01); *F05D 2260/36* (2013.01)

(58) Field of Classification Search
CPC .......... F01D 5/3007; F01D 5/282; F01D 5/30; F01D 5/3092; F01D 5/323; F01D 5/326;
(Continued)

(56) References Cited

U.S. PATENT DOCUMENTS 2,786,648 A * 3/1957 Ledwith ................. F01D 5/323
416/221
4,102,602 A * 7/1978 Rottenkolber ........ F01D 5/3084
416/241 B
(Continued)

FOREIGN PATENT DOCUMENTS

EP        1764480 A1 * 3/2007 ........... F01D 5/3092
EP   DR EP 1 764 480 A1    3/2007
(Continued)

OTHER PUBLICATIONS

International Search Report as issued in International Patent Application No. PCT/FR2022/051203, dated Aug. 30, 2022.

*Primary Examiner* — Courtney D Heinle
*Assistant Examiner* — Ryan C Clark
(74) *Attorney, Agent, or Firm* — Pillsbury Winthrop Shaw Pittman LLP

(57) ABSTRACT

A foil and a root of a blade of a turbomachine rotor and includes a base, two side limbs that are connected to each other by the base, at least the first limb includes at least one recess including at least two folds in two different directions, the recess being capable of engaging with a notch provided in the root of the blade to ensure the foil is longitudinally retained relative to the root of the blade at least in a longitudinal direction.

9 Claims, 3 Drawing Sheets

(58) Field of Classification Search
CPC ........... F05D 2230/60; F05D 2230/602; F05D 2260/36; F05D 2260/37; F05D 2260/38
See application file for complete search history.

(56) References Cited

U.S. PATENT DOCUMENTS

| | | | | |
|---|---|---|---|---|
| 4,462,756 | A | * | 7/1984 | Muggleworth ........... F01D 5/32 416/216 |
| 5,074,752 | A | * | 12/1991 | Murphy ................. F01D 9/042 415/119 |
| 6,431,835 | B1 | * | 8/2002 | Kolodziej ............. F01D 5/3092 416/248 |
| 9,039,379 | B2 | * | 5/2015 | Radomski ............. F01D 5/3007 416/220 R |
| 10,415,402 | B2 | * | 9/2019 | Murdock .............. F01D 5/3092 |
| 10,655,486 | B2 | * | 5/2020 | Bulot .................... F16J 15/061 |
| 2017/0234148 | A1 | * | 8/2017 | Desreumaux .......... F01D 5/005 415/1 |

FOREIGN PATENT DOCUMENTS

| | | | |
|---|---|---|---|
| EP | 2042689 A1 * | 4/2009 | ........... F01D 5/3007 |
| EP | EP 2 042 689 A1 | 4/2009 | |
| WO | WO 2021/013280 A1 | 1/2021 | |

\* cited by examiner

FOIL, ROTOR BLADE, ASSEMBLY FOR A TURBOMACHINE ROTOR AND ROTOR

CROSS-REFERENCE TO RELATED APPLICATIONS

This application is the U.S. National Stage of PCT/FR2022/051203, filed Jun. 21, 2022, which in turn claims priority to French patent application number 2107207 filed Jul. 2, 2021. The content of these applications are incorporated herein by reference in their entireties.

TECHNICAL FIELD OF THE INVENTION

The technical field of the invention is that of turbine blades.

The present invention relates to a foil for a turbomachine moving blade, a turbine blade as well as an assembly comprising a moving blade, the root of which is provided with said foil (tinsel). The invention also relates to a turbomachine.

TECHNOLOGICAL BACKGROUND OF THE INVENTION

Conventionally, an axial turbine of a turbomachine is comprised of a succession of axial stages (along the axis of circulation of the gas streams) disposed behind each other. Each stage includes a rotor wheel having blades forming the rotor and a vaned distributor forming the stator. The rotor wheel is rotated opposite the corresponding distributor.

The rotor wheel conventionally consists of an annular disc centred to the axis of rotation of the rotor wheel, comprising cells (recesses) and a plurality of moving blades each comprising an attachment member referred to hereinafter as a blade root in a housing in the form of a dedicated cell.

Several types of stress are exerted in the contact zones between the root of each moving blade and the cell of the disc housing this root.

There is especially "fretting", i.e. contact wear, which is the consequence of repetitive friction between one part and another, the resulting friction forces being able to cause damage to the material by different fatigue processes. This phenomenon is particularly noticeable in the case of contact between two parts, for example made of metal or CMC.

These zones are thus subject to a significant tendency for the material to be damaged, as well as wear on the blade root seats, which are the zones in contact with the cell wall, and even deformation of these contact zones.

In addition, the level of local stresses is very high due to the coefficient of friction at the interface between the walls in contact with the blade root and the cell, formed by metal/metal contact. In the following, this interface is referred to as the blade root seat and the cell seat.

To solve these problems, it is especially sought to enhance wear resistance of the surfaces in contact and to reduce the coefficient of friction.

To achieve this, a protective part is generally used, which may be a consumable, formed by one or more metal foils fitted to the root of the blade.

With this type of solution, a decrease in the coefficient of friction is achieved and the foil can be changed instead of a whole blade.

For example, document EP2042689A1 proposes utilising an assembly with a metal foil between a blade root and a disc.

On turbine blades, foils are placed between the blade roots and the disc cells to prevent wear on these parts. These ensure mechanical integrity of the parts with which they are in contact.

In prior art foils, these are held in position on the blade roots by two folded tabs projecting from the base of the foil located at the bottom of the blade root.

During the operation of the turbine, in some situations possible axial displacements of the foils have been observed, which may damage the sensitive tabs as a result of their folding/unfolding during the foil assembly phase. In some cases, this damage can lead to cutting and possible axial disengagement of the foils. In these situations, once the tabs have been cut, the foils can disengage partially or totally from the blade roots.

Disengagement of the foils no longer ensures mechanical integrity of the blade root and the turbine disc. This axial disengagement of the foil therefore results in at least a portion of the blade root being unprotected and thus in premature wear of the blade root in place of the foil produced by "fretting".

The cut tabs may furthermore in some situations end up in an air stream and damage shock-sensitive blades located downstream of the turbine.

Also known from document EP1764480A1 is a foil whose tab is formed by two lugs, each extending from the ends of the legs, connected together by a connecting part by welding, riveting or interlocking. Such a tab entails additional production costs and, furthermore, even if the connecting part makes it possible to increase the strength of the tab, it does not prevent one of the lugs of the tab from breaking at the end of one of both legs.

Foils are also known, especially in document EP2042689A1 filed by the applicant, comprising a tab folded towards the rotor rather than towards the blade, however the tab is still liable to unfold or tear and cause wear to at least one portion of the blade. Furthermore, in this document, there is a wedge between the foil and the bottom of the disc cell. The foil therefore has its base between the wedge and a surface of the blade root. A latch is mounted retained between an upstream edge of the wedge and the blade root, so that the holding tab is retained between the latch and the blade root, thereby preventing axial movement of the foil relative to the blade root.

However, this solution is difficult to implement and is not always possible for reasons of overall size and mechanical strength of the blade or disc.

SUMMARY OF THE INVENTION

The invention offers a solution to at least one of the problems previously discussed, by enabling the foils (tinsels) not to disengage from the blade roots and to ensure mechanical integrity of the blade root and the turbine disc.

A first aspect of the invention relates to a foil for mounting on a blade root of a rotor having an axis of rotation, extending longitudinally comprising:
 a base,
 a first side leg and a second side leg connected together through the base,
 at least the first leg comprises at least one recess comprising at least two folds in two different directions, the recess being able to cooperate with a notch provided in the root of the blade to ensure that the foil is longitudinally held relative to the root of the blade at least in one longitudinal direction.

By virtue of the recess in one leg, the foil cannot become dislodged from the blade root along the axis of the rotor disc, which acts as a stop. Furthermore, the recess is stronger than a tab formed by a single fold, due to its different folds.

Further to the characteristics just discussed in the previous paragraph, the method according to one aspect of the invention may have one or more complementary characteristics from among the following, considered individually or according to any technically possible combinations:

According to one embodiment, the foil comprises a first side edge and a second side edge extending over the base and the legs, and in that the recess is located between and distant from the first side edge and the second side edge, forming a longitudinal stop in both axial directions of the foil in the root of the blade. Placing the recess between both side edges prevents the blade from disengaging in either axial direction. The foil therefore longitudinally extends between both side edges forming its ends.

According to one embodiment, the foil comprises a longitudinal edge on each side leg, one longitudinal edge being contiguous with the recess.

According to one exemplary embodiment, the first side leg comprises a planar surface comprising the longitudinal edge and in that the recess extends from this planar surface towards the other leg. This makes it easy to make the recess and a longitudinal stop without a slope.

According to one feature of this example, the planar surface is perpendicular to the base. This makes it possible to have a recess which extends towards the other leg parallel to the base, making it possible to form a longitudinal and radial stop without a slope.

According to one feature of this example, the first fold of the recess longitudinally extends from the planar surface of the first side leg forming a first reinforcing wall and the second fold extends from the first reinforcing wall two opposite to stop walls each to form a longitudinal stop in at least one axial direction of the foil in the blade root. Thus the recess comprises two folds each forming two surfaces extending in two different directions for increasing the strength of the recess.

According to one feature of this example, the second fold extending from the first reinforcing wall further forms a second reinforcing wall perpendicular to the first reinforcing wall.

According to one embodiment, the recess comprises:
two longitudinal folds extending longitudinally,
two depth folds, each depth fold extending between one end of the first longitudinal fold and the other longitudinal fold, and
four radial folds extend radially from the longitudinal edge towards the ends of the longitudinal folds and the depth folds.

According to one exemplary embodiment, the recess comprises:
a first reinforcing wall delimited between:
both longitudinal folds, one of both longitudinal folds longitudinally extending from the planar surface of the first side leg, and
each depth fold,
two opposite stop walls each to ensure that the foil is longitudinally held relative to the root of the blade, at least in one longitudinal direction, each delimited between:
one of both depth folds, and
two of the four radial folds.

In one embodiment, the first fold forms a radial bearing surface.

This further makes it possible to form radial bearing for the foil on a surface of a notch of the blade root, thus making it possible to reduce displacement of the foil relative to the blade root when the rotor is being rotated.

In one embodiment, the recess in the first leg projects towards the other leg. This makes it possible to form a stop in a notch of the blade.

In one embodiment, the foil comprises a second recess on the second leg. This increases the resistance to deformation of the recesses.

According to one example of this embodiment, the second leg may be symmetrical to the first leg. This allows the foil to be inserted into both longitudinal directions around the blade root.

According to one embodiment, the foil is flexible. Flexibility of the foil allows it to deform. When the blade root is inserted between both legs, the recess bears against a surface of the blade root until the recess enters a notch in the blade root.

A second aspect of the invention relates to a rotor blade movable about an axis of rotation, comprising an inner platform, a vane radially extending from the platform, and a blade root radially extending from this platform opposite to the vane, the blade root comprising:
a first radial face,
a second radial face opposite to the first radial face longitudinally,
a first side longitudinal face joining each radial face, and a second side longitudinal face joining each radial face,
at least one flank on each side longitudinal face, comprising a seat for bearing against a surface of a housing of the blade root,
characterised in that at least the first side longitudinal face has a notch comprising at least one longitudinal stop surface extending in a plane intersecting the axis of rotation and a guide surface extending in a direction other than the longitudinal stop surface, the notch being intended to receive a recess of a foil to ensure that the foil is longitudinally held relative to the blade root at least in a longitudinal direction.

The notch prevents the foil from dislodging from the blade root along the axis of the rotor disc, and acts as a stop with a recess of the foil. Furthermore, the notch comprises two surfaces enabling the recess to have two folds and two surfaces with different orientations, thus enabling the recess to be stronger than a tab formed by a single fold, due to its different folds.

According to one embodiment, the longitudinal stop surface extends in a plane intersecting the axis of rotation.

According to one embodiment, the notch is located between and distant from each radial face. This makes it possible to block the foil in both longitudinal directions.

According to one embodiment, the blade root comprises a lower surface connecting both side longitudinal faces and both radial faces and in that the lower surface is closer to the flank than to the notch.

According to one example of this embodiment, the blade root comprises a base portion comprising the seats and a restricted portion extending between the inner platform and the base portion, the restricted portion having a width less than the least width of the base portion, and in that the notch extends from a planar surface of the first side longitudinal face into the restricted portion, forming the longitudinal stop surface and a second longitudinal stop surface perpendicular to the lower surface and tilted with respect to the planar surface to ensure that the foil is longitudinally held relative to the blade root in the other longitudinal direction.

According to one example, the base portion comprises the seats, this base portion flares out from the restricted portion.

The invention also relates to a turbomachine rotor assembly including:
- a moving blade according to the second aspect of the invention previously described with or without the different combinations of the different advantages previously described;
- a foil of the first aspect of the invention previously described with or without the different combinations of the different advantages previously described, the foil being mounted to the blade root such that the recess is complementary to the notch in the blade root and is housed in the notch and axially bears against at least the longitudinal stop surface.

The invention also relates to a rotor including the assembly previously described and a rotor disc including cells provided in the outer periphery of the rotor disc, the blade root being housed in one of the cells.

Advantageously, a maximum width A of the recess, measured in a direction tangential to the axis of the rotor disc, from an end of the recess to a bottom of the recess, is greater than a distance B measured on the same straight line from the end of the recess to the rotor disc.

A fourth aspect of the invention relates to a turbomachine including the rotor.

BRIEF DESCRIPTION OF THE FIGURES

The figures are set forth by way of indicating and in no way limiting purposes of the invention.

DETAILED DESCRIPTION

Unless otherwise specified, a same element appearing in different figures has a single reference.

The invention is concerned with a foil (tinsel) for a root of a moving blade of a turbomachine, the moving blade, as well as an assembly for a turbomachine rotor comprising a moving blade having its root inserted into such a foil and finally the rotor comprising a rotor disc comprising cells (recesses) and at least one blade root inserted into the cell.

Figure 1:
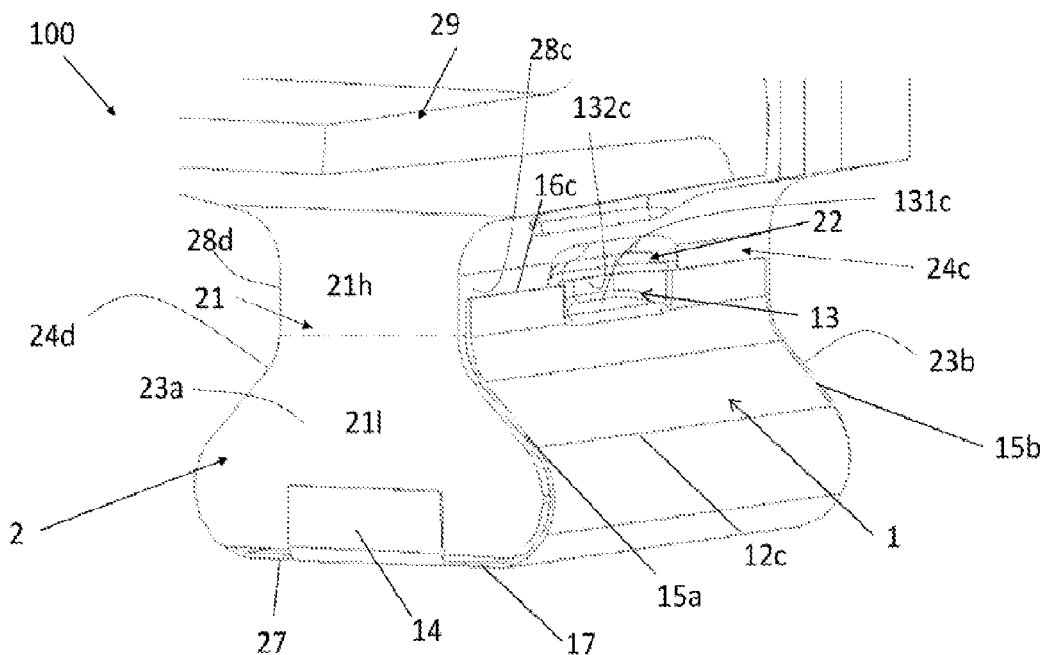
FIG. 1 is a perspective view of an assembly comprising a blade root according to a first embodiment of the invention inserted into a foil according to a second embodiment of the invention.

FIG. 1 shows a perspective view of an assembly 100 according to the invention comprising a foil 1 and a blade 2.

Figure 2:
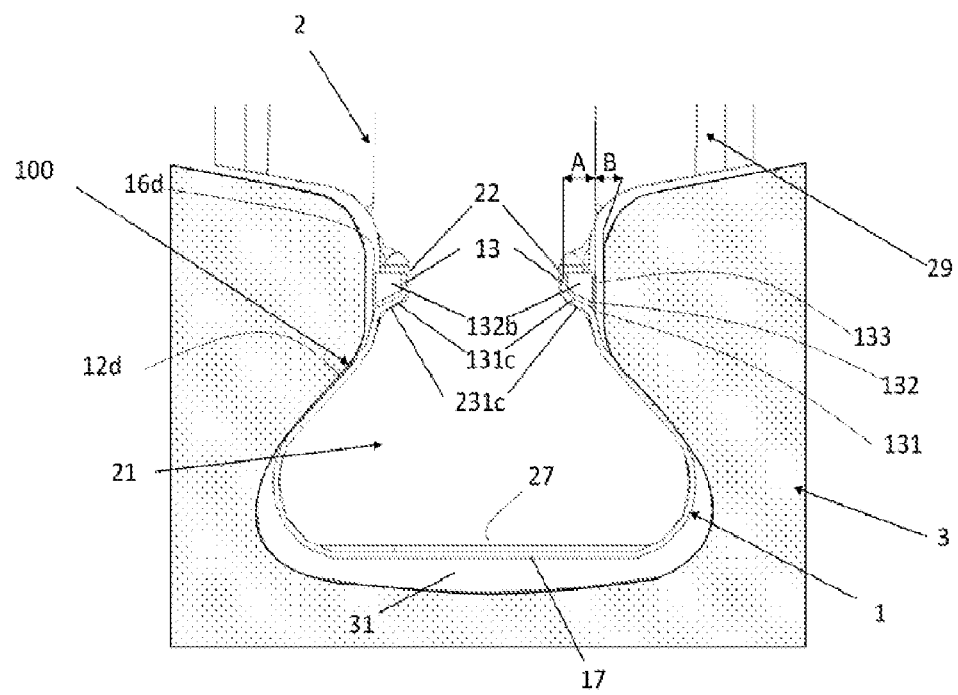
FIG. 2 is a cross-sectional view of the assembly of FIG. 1 mounted in a cell of a turbine disc.

FIG. 2 is a cross-sectional view of the assembly 100 of FIG. 1 mounted in a cell 31 of a rotor disc 3.

The blade 2 comprises a vane (not visible) radially extending between a radially outer end and a radially inner end. At its radially outer end, the blade 2 comprises a heel (not represented). At its radially inner end, the blade 2 comprises an inner platform 29 (partially represented in FIGS. 1 and 2), the root 21 of which radially extends towards the bottom of the cell 31. The root 21 enables the blade 2 to be fastened to the rotor disc 3 by being retained by seats in the cell 31 of the disc 3.

The root 21 of the blade 2 comprises a first radial face 23a and a second radial face 23b on either side of the root 21 longitudinally.

The root 21 comprises a radial base portion 21l comprising the seats and a restricted portion 21h extending between the inner platform 29 and the base portion 21l. Dotted lines in FIG. 1 represent the boundary between the restricted portion 21h and the base portion 21l. The base portion 21l flares out from the restricted portion 21h widening to form the seats and then tapers to an inner surface 27 to face the bottom of the cell 31 of the disc 3.

The root 21 further comprises two side longitudinal faces 24c, 24d of the base portion 21l and of the restricted portion 21h, each connecting the first radial face 23a and the second radial face 23b.

Each side longitudinal face 24c, 24d thus comprises in the base portion 21l at least one flank for forming a seat of the root 21 against a seat of the cell 31.

In this example, each side longitudinal face 24c, 24d comprises, in the restricted portion, a planar surface 28c, 28d extending from the base portion 21l and in this example a surface flaring towards the inner platform.

The foil 1 comprises a complementary shape with the root 21.

A first aspect of the invention relates to the foil 1 represented in the figures surrounding the root 21 of the correspondingly shaped blade 2 and a second aspect of the invention relates to the blade 2 comprising the root 21. In particular, the foil 1 surrounds the base portion 21l of the root 21 and at least partially the restricted portion 21h of the root 21.

The foil 1 includes a base 17 covering a lower surface 27 of the root 21, as well as a first side leg 12c and a second side leg 12d visible in FIG. 2. In FIG. 1, only the first side leg 12c is visible. The two side legs 12c, 12d are connected to each other through the base 17. The first and second side legs 12c, 12d each cover one of both corresponding longitudinal faces 24c, 24d of the root 21. The side legs 12c, 12d form means for protecting, for example against fretting, the longitudinal faces 24c, 24d of the root 21 in a cell 31 of the disc 3 represented in FIG. 2.

Herein, in this example, the foil 1 comprises, on each side leg 12c, 12d, a planar surface 18 surrounding the planar surface 28c of the restricted portion.

The foil 1 comprises a first and a second side edge 15a, 15b extending over one end of the base 17 and side legs 12c, 12d forming opposite longitudinal ends of the foil 1. The foil 1 also comprises at the end of each of its side legs 12c, 12d, a longitudinal edge 16c, 16d longitudinally extending along the planar surface 18 and connecting both side edges 15a, 15b. The longitudinal edge 16d of the second side leg 12d is represented in FIG. 2 and that of the first side leg 12c is referenced in FIG. 1.

In order to block relative movements between the foil 1 and the root 21, the root 21 comprises at least one notch 22 on one of both side longitudinal faces 24c, 24d and the foil 1 comprises at least one recess 13 in the notch 22 of the root 21, located on a side leg 12c, 12d.

By recess, it is meant a hollow shape projecting from a surface.

By notch, it is meant a portion recessed into the mass of the root 21 of the blade 2.

Herein, in this example, each side longitudinal face 24c, 24d comprises a notch 22 and the foil 1 comprises two recesses 13, which are visible in FIG. 2. In this case, each recess 13 is located on the longitudinal edge 16c, 16d. By "located on the longitudinal edge 16c, 16d", it is meant that the recess 13 comprises a portion of the longitudinal edge 16c, 16d, in other words the deformation of the recess 13 deformed the longitudinal edge 16c, 16d. Each notch 22 has a similar shape to the corresponding recess 13 of the foil 1.

Herein, the restricted portion 21h comprises on either side both notches 22 extending from the corresponding planar surface 28c into the matter of the restricted portion 21h. By "into the matter", it is meant towards the centre of the restricted portion.

In the following, only the recess 13 of the first leg 12c and the notch 22 of the first side longitudinal face 24c will be described to simplify the description, since in this example the legs 12c, 12d (including the recesses 13) and the side longitudinal faces 24c, 24d (including the notches 22) are herein identical.

Figure 3:
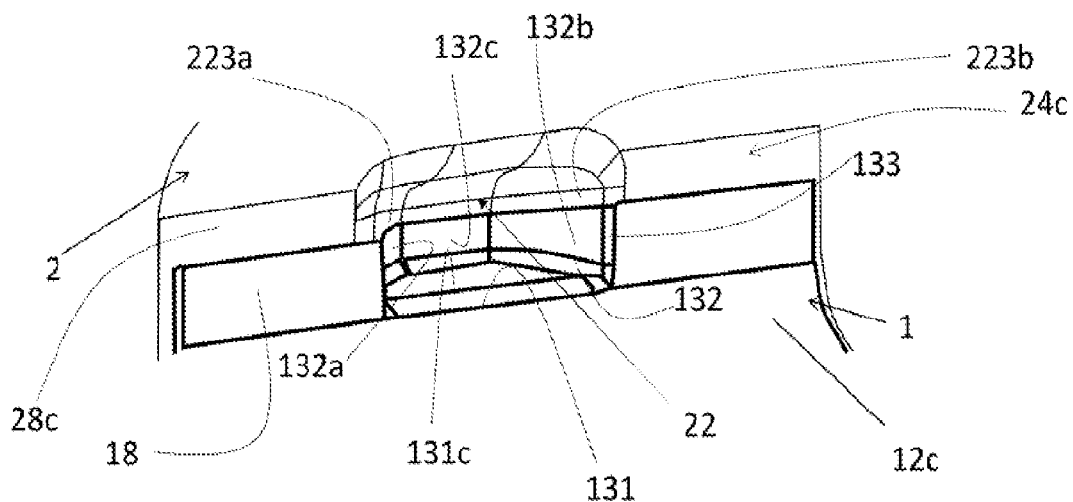
FIG. 3 is an enlarged view of the assembly of FIG. 1 on a recess of the blade root.

FIG. 3 shows an enlarged view of FIG. 1, on a recess 13 of the first side leg 12c of the foil 1 in a notch 22 of the root 21 having finer lines than that of the foil 1.

The recess 13 comprises at least a first fold 131 and a second fold 132 of a different direction. Herein, in this example, the recess 13 comprises eight folds forming edges of the recess 13.

In the eight folds, the recess 13 comprises:
two longitudinal folds extending longitudinally, one of which is referred to in the following as the first fold referenced 131,
two further depth folds, one of which is hereinafter referred to as the second depth fold 132, each depth fold extending between one end of the first longitudinal fold 131 and the other longitudinal fold, and
four radial folds radially extend from the longitudinal edge 16c toward the ends of the longitudinal folds 131 and the depth folds, one of which is referred to as the third fold, referenced 133.

The recess 13 extends from the planar surface 18 towards the other leg 12d.

In this example, the notch 22 is located between and distant from each radial face 23a, 23b, and the recess 13 is therefore also located between and distant from the first side edge 15a and the second side edge 15b.

According to another embodiment, one example of which is represented and explained below in FIGS. 4a and 4b, the notch 22 is in the angle between one of both radial faces 23a, 23b and a side longitudinal face 24c, 24d forming at least two distinct surfaces and the recess 13 is formed on a side edge 15a, 15b comprising at least two folds 131, 132 in different orientations forming at least two surfaces corresponding to the notch 22. For example, one of both side legs 12c, 12d comprises a first recess 13 on one side of one of both radial faces 23a, 23b and the other side leg 12d, 12c comprises a second recess 13 on one side of the other radial face thus enabling a longitudinal stop to be formed in both directions.

In this example, the foil 1 is mounted to the root 21, such that the recess 13 snugly fits the notch 22 to ensure that the foil 1 is held axially relative to the blade 2 of the root 21, herein in both directions of the axial (or longitudinal) direction of the foil 1 with respect to the root 21. The recess 13 and the notch 22 make it possible to hold the foil 1 relative to the root 21 by contact between a stop surface 223a, 223b of the notch 22 and a stop wall 132a, 132b of the recess 13 formed by folds of the foil 1 of a different orientation.

Herein, each notch 22 comprises two longitudinal stop surfaces 223a, 223b extending in a plane intersecting the axis of rotation, and the recess 13 comprises two stop walls 132a, 132b formed by three folds, one of the depth folds 132, and two radial folds 133 for coming into contact against the corresponding stop surface 223a, 223b thus making it possible to form a stop in both axial directions of the foil 1 in the notch 22 of the root 21 of the blade 2.

By "two longitudinal stop surfaces 223a, 223b extending in a plane intersecting the axis of rotation", it is meant that they extend substantially perpendicularly to the lower surface 27 of the root 21 but may be tilted or parallel to the radial faces 23a, 23b. By substantially perpendicular, it is meant between 70 and 110°.

In this example, the recess 13 comprises a first reinforcing wall 131c formed between both longitudinal folds 131 and both depth folds 132. This first reinforcing wall 131c can be used to form a radial stop, against a wall 231c of the notch 22. This first reinforcing wall 131c can be used to reinforce both stop walls 132a, 132b.

Both depth folds 132 therefore extend along this first reinforcing wall 131c and each extend along both stop walls 132a, 132b. Herein, the reinforcing wall 131c is tilted with respect to the surface of the base 17 but could be parallel.

Herein, in this example, the recess 13 comprises a second reinforcing wall 132c longitudinally extending between these two stop walls 132a, 132b and along the other longitudinal fold. The second reinforcing wall 132c may come against the bottom of the notch 22, however in this example there is a clearance between the bottom of the notch 22 and this second reinforcing wall 132c makes it possible to reinforce both stop walls 132a, 132b to prevent them from folding when they are subjected to an axial force by holding the foil 1 relative to the root 21.

The notch 22 thus extends from the planar surface 28c of the side longitudinal face 24 into the restricted portion 21h, forming both longitudinal stop surfaces 223a, 223b, which are in this example perpendicular to the lower surface 27 and tilted towards each other with respect to the planar surface 28c to form a longitudinal stop of a recess 13 of a foil 1.

The notch 22 further forms a guide surface 231c facing the first reinforcing wall 131c to enable the recess 13 to be guided into the notch 22 when the root 21 is inserted into the foil 1.

Advantageously, the recess 13 is obtained by stamping.

The side legs 12c, 12d of the foil 1 are elastically flexible such that the side legs 12c, 12d can move closer to or away from each other. If there is no stress on the legs 12, they return to their initial shape. This flexibility allows the foil 1 to be inserted on the root 21 of the blade 2 by moving the legs 12 apart. This flexibility is necessary to insert the foil 1 onto the root 21. When the root 21 is inserted between both side legs 12c, 12d, each recess 13 bears against the corresponding planar surface 28c, 28d of the restricted portion 21h of the root 21 of the blade 2, until each recess 13 enters the corresponding notch 22.

Advantageously, the foil 1 has two tabs 14 projecting from the base 17 at the first and second side edges 15a, 15b. Thus, the tabs 14 form stops which bear axially against the radial faces 23 of the root 21 so as to block, with each recess 13 in the corresponding notch 22, relative movements between the root 21 and the foil 1 and thus increase the resistance of the foil 1 against deformation of its recess 13 or its tabs 14. According to another example, the foil 1 is devoid of these tabs 14 or only includes one of them.

Advantageously, the notch 22 is obtained by moulding or machining.

FIG. 2 represents a radial cross-section of the foil 1 at the recess 13 and of the root 21 of the moving blade 2 engaged in a cell 31 formed in the outer periphery of the disc 3 and radially held in the cell 31 by the seats by a shape cooperation between the root 21 and the cell 31. Advantageously, the root 21 of the mobile blade 2 is dovetail-shaped.

When the rotor disc 3 is being rotated, the moving blades 2 are subjected to centrifugal forces and the seats of the roots 21 stop against the seats of the cells 31 of the disc 3.

In order to limit wear on the roots 21, the foil 1 is positioned at the contact interface between the roots 21 and the cells 31 of the disc 3.

With reference to FIG. 2, for the recess 13 not to come out of the notch 22 when it is positioned in a cell 31 of the disc 3, a maximum width A of the recess 13, measured in a direction tangential to the axis of the disc 3, from one end of the recess 13 is greater than a distance B measured on the same straight line between the end of the recess 13 and the rotor disc 3. In other words, in this example, the maximum width A of the recess 13 is measured between the second reinforcing wall 132c and the first or second fold 131, 132 at the planar surface 18 and the distance B is measured between the first or second fold 131, 132 at the planar surface 18 and a surface of the cell 31. Thus, the recess 13 cannot dislodge from the notch 22 by overall size when the root 21 is positioned in a cell 31 of the disc 3.

Figure 4A:
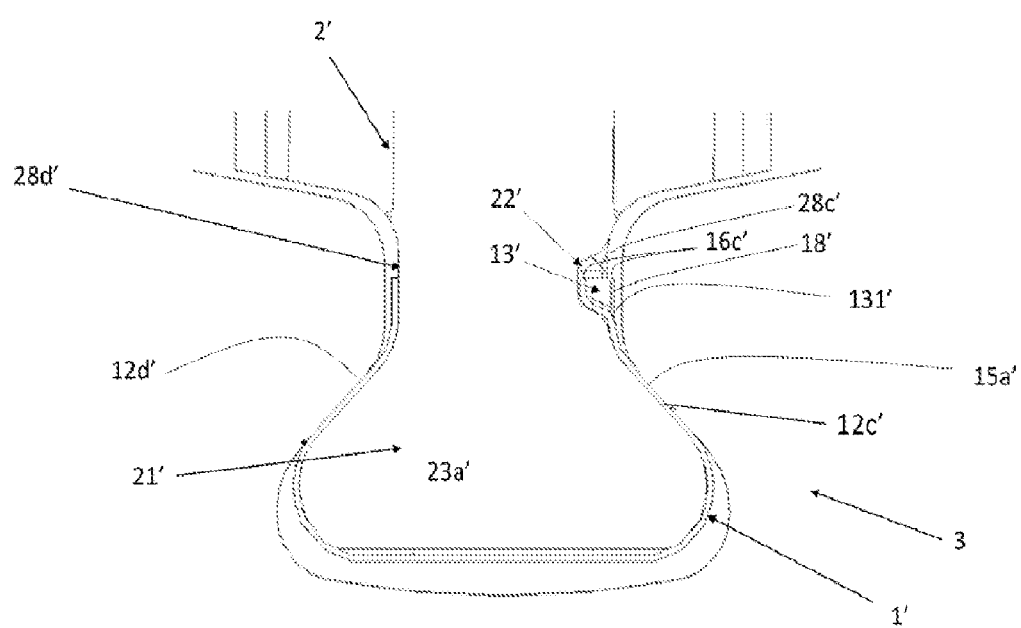
FIG. 4a is a front view of an assembly comprising a blade root according to a second embodiment of the invention inserted into a foil according to a second embodiment of the invention.

FIG. 4a represents a front view of the first radial face 23a' of a root 21' of a blade 2' of a second embodiment and of a foil 1' according to a second embodiment inserted around the root 21'. FIG. 4b represents an enlarged view of FIG. 4a at the recess 13' and the notch 22'.

The root 21' and the foil 1' of this second embodiment are identical respectively to the root 21 and the foil 1 of the first embodiment except for the following characteristics:

In this second embodiment, the notch 22' extends, as in the first embodiment, over the planar surface 28c' of the first side longitudinal face 24 in the restricted portion 21h but, unlike in the first embodiment, this notch 22' opens onto the first radial face 23a'. Of course, the notch 22' can extend over a length of the first side longitudinal face 24c that is less than half the total length of the first side longitudinal face 24c, for example a quarter of this length.

The foil 1' of this second embodiment therefore comprises, on the first side leg 12c', a recess 13' in the notch 22' of the root 21. The recess 13' of this foil 1' according to the second embodiment is therefore contiguous with the first side edge 15a'. In other words, the recess 13' is different from the first embodiment in that two longitudinal folds 131', 135 (referenced in FIG. 4b) each extend from the first side edge 15a' longitudinally forming the reinforcing wall 131c'.

The recess 13' therefore only comprises a single stop wall 132b'.

The recess 13' therefore comprises five folds: two longitudinal folds 131', 135, two radial folds 133', 136 and a single depth fold 132'.

Further in this example of this second embodiment, as in the first embodiment, the recess 13' is contiguous with the first longitudinal edge 16c' and the recess 13' extends from the planar surface 18' towards the other leg 12d'. In one alternative embodiment, the recess 13 may be located on the second longitudinal edge 16d and the side leg 12d.

Further in one alternative to these examples of this second embodiment, the recess 13 is still located on the first side leg 12c' but distant from the first longitudinal edge 16c', the recess 13 then comprises two other longitudinal folds and another depth fold forming another reinforcing wall.

Figure 4B:
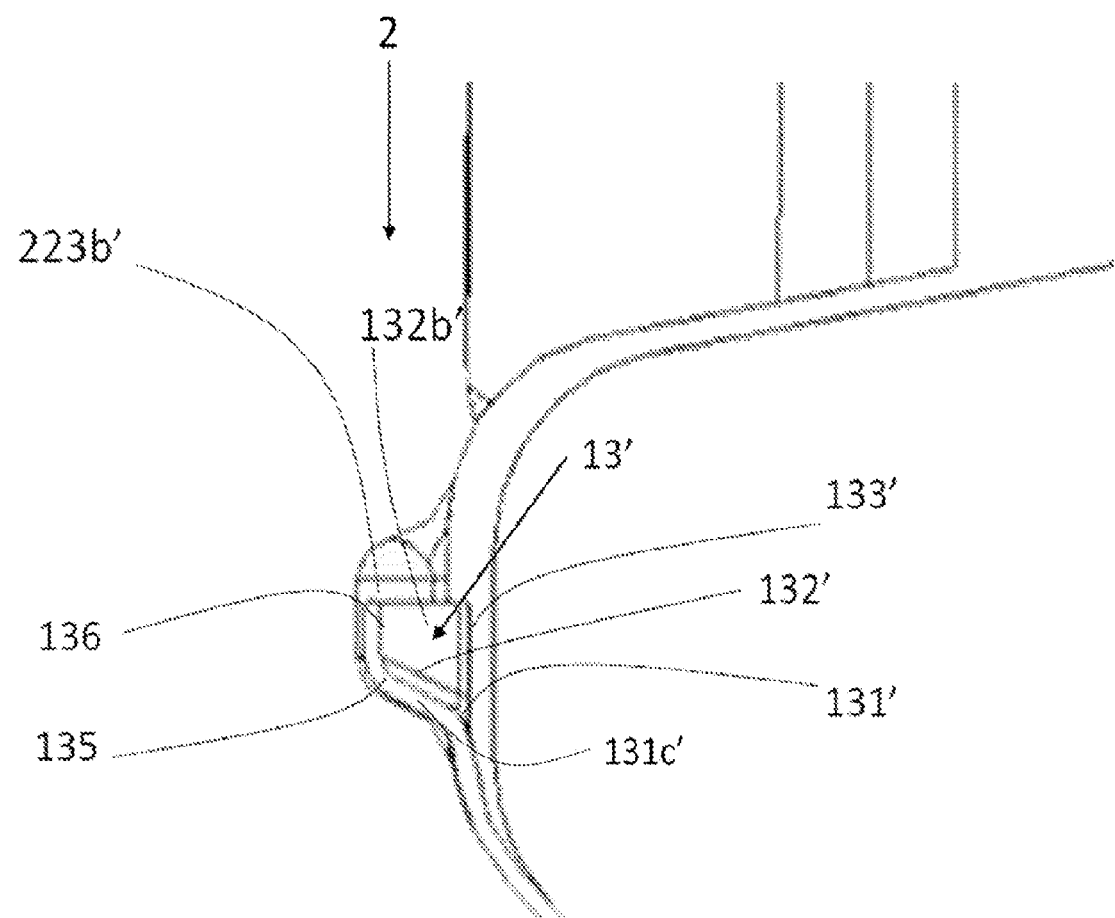
FIG. 4b is an enlarged view of the assembly of FIG. 4a on a recess of the foil in a notch of the blade root.

Thus, the foil 1' is mounted to the root 21', such that the recess 13' represented in FIGS. 4a and 4b snugly fits the notch 22' to ensure that the foil 1' is longitudinally held relative to the root 21' in a single axial direction of the foil 1' relative to the root 21'.

The stop between the recess 13' and the notch 22' is formed on the one hand by a stop surface 223b' and a stop wall 132b' formed by the depth fold 132' and both radial folds 133', 136 of the foil 1'.

The foil 1' may therefore comprise a further recess in another notch to ensure that the foil 1' is longitudinally held relative to the root 21' in the other axial direction of the foil 1 relative to the root 21. For example, the first and/or second leg 12c,' 12d', comprises a recess similar to the recess 13' but contiguous with the second side edges 15b and the root comprises a second notch opening onto its second radial face 23b.

According to yet another non-represented example of another embodiment, the second leg 12d' and the planar surface 28d' of the second side longitudinal face are identical to those of the first embodiment, comprising a recess 13 and a notch as in the first embodiment ensuring holding in both longitudinal directions.

The invention claimed is:

1. A foil for being mounted to a root of a blade of a turbomachine rotor and comprising:
   a base,
   a first side leg and a second side leg connected together through the base,
   wherein at least the first leg comprises at least one recess comprising at least two folds in two different directions, the at least one recess being able to cooperate with a notch provided in the root of the blade to ensure that the foil is longitudinally held relative to the root of the blade at least in one longitudinal direction.

2. The foil according to claim 1, comprising a first side edge and a second side edge extending over the base and the legs, and in that the recess is located between and distant from the first side edge and the second side edge, forming a longitudinal stop in both axial directions of the foil in the root of the blade.

3. The foil according to claim 1, comprising on each side leg a longitudinal edge, one longitudinal edge being contiguous with the recess.

4. The foil according to claim 1, wherein the first side leg comprises a planar surface including the longitudinal edge and in that the recess extends from that planar surface towards the other leg.

5. The foil according to claim 1, comprising:
   two longitudinal folds extending longitudinally,
   two depth folds, each depth fold extending between one end of the first longitudinal fold and the other longitudinal fold, and
   four radial folds extend radially from the longitudinal edge towards the ends of the longitudinal folds and the depth folds.

6. The foil according to claim 5, wherein the recess comprises:
   a first reinforcing wall delimited between:
      both longitudinal folds, one of both longitudinal folds longitudinally extends from the planar surface of the first side leg, and
      each depth fold,
   two opposite stop walls each to ensure that the foil is longitudinally held relative to the root of the blade, at least in one longitudinal direction, each delimited between:
      one of both depth folds, and
      two of the four radial folds.

7. A blade of a rotor movable about an axis of rotation, comprising an inner platform, a vane radially extending from the inner platform and a root of the blade radially extending from this inner platform opposite to the vane, the root of the blade comprising:
- a first radial face,
- a second radial face opposite to the first radial face longitudinally
- a first side longitudinal face joining each radial face
- a second side longitudinal face joining each radial face,
- at least one flank on each side longitudinal face, comprising a seat for bearing against a surface of a housing of the root of the blade,
- wherein at least the first side longitudinal face has a notch comprising at least one longitudinal stop surface extending in a plane intersecting the axis of rotation and a guide surface extending in a direction other than the longitudinal stop surface, the notch being intended to receive a recess of a foil to ensure that the foil is longitudinally held relative to the root of the blade at least in a longitudinal direction,
- wherein the notch is located between and distant from each radial face, and
- wherein the root of the blade comprises a base portion comprising the seats and a restricted portion extending between the inner platform and the base portion, the restricted portion having a width less than the least width of the base portion and in that the notch extends from a planar surface of the side longitudinal face into the restricted portion, forming the longitudinal stop surface and a second longitudinal stop surface perpendicular to the lower surface and tilted with respect to the planar surface to ensure that the foil is longitudinally held relative to the root of the blade in the other longitudinal direction.

8. A turbomachine rotor assembly, comprising:
a moving blade according to claim 7;
the foil mounted to the root of the blade, and in that the recess is complementary to the notch in the root of the blade and is housed in the notch and axially bears against at least the longitudinal stop surface.

9. A rotor comprising the assembly according to claim 8 and a rotor disc including cells formed in an outer periphery of the rotor disc, the root of the blade being housed in one of the cells, wherein a maximum width A of the recess, measured in a direction tangential to an axis of the rotor disc, from an end of the recess to a bottom of the recess, is greater than a distance B measured on the same straight line from the end of the recess to the rotor disc.

* * * * *